US006986508B2

(12) United States Patent
Alers et al.

(10) Patent No.: US 6,986,508 B2
(45) Date of Patent: Jan. 17, 2006

(54) SPRING HOLDING CONE FOR HOLDING A SPRING END OF A SPIRAL TORSION SPRING

(75) Inventors: Jürgen Alers, Lippstadt (DE); Jochen Birwe, Anröchte (DE)

(73) Assignee: Wilhelm Brand KG, Anrochte (DE)

( * ) Notice: Subject to any disclaimer, the term of this patent is extended or adjusted under 35 U.S.C. 154(b) by 163 days.

(21) Appl. No.: 10/349,641

(22) Filed: Jan. 23, 2003

(65) Prior Publication Data

US 2003/0141643 A1 Jul. 31, 2003

(30) Foreign Application Priority Data

Jan. 25, 2002 (EP) ........................................... 02001723

(51) Int. Cl.
*F16F 1/06* (2006.01)

(52) U.S. Cl. .................... 267/179; 267/155; 267/166.1

(58) Field of Classification Search ................ 267/286, 267/179 O, 166, 155, 154, 166.1
See application file for complete search history.

(56) References Cited

U.S. PATENT DOCUMENTS

| | | | | |
|---|---|---|---|---|
| 1,835,258 A | | 12/1931 | Axe | |
| 2,294,360 A | | 9/1942 | Blodgett | 20/20 |
| 3,779,537 A | * | 12/1973 | Kalister | 267/166.1 |
| 4,162,064 A | * | 7/1979 | Bouton et al. | 267/179 |
| 4,475,725 A | * | 10/1984 | Niemann | 267/286 |
| 4,817,927 A | * | 4/1989 | Martin | 267/155 |
| 5,201,897 A | | 4/1993 | Whiting | 267/155 |
| 6,174,575 B1 | | 1/2001 | Foucault et al. | 428/34.1 |
| 6,485,006 B1 | * | 11/2002 | Beaudoin et al. | 267/155 |
| 6,615,897 B2 | * | 9/2003 | Dorma | 267/155 |
| 2001/0039761 A1 | | 11/2001 | Savard et al. | 49/199 |

FOREIGN PATENT DOCUMENTS

| | | |
|---|---|---|
| DE | G 92 00 454.7 | 1/1992 |
| GB | 572476 | 10/1945 |

* cited by examiner

*Primary Examiner*—Robert A. Siconolfi
*Assistant Examiner*—Melanie Torres
(74) *Attorney, Agent, or Firm*—Thomas, Kayden, Horstemeyer & Risley, LLP

(57) ABSTRACT

A spring holding cone (1) for a spring end of a spiral torsion spring (13), especially a sectional door spring for an industrial door or a garage sectional door, has an outside surface (2) for supporting the spring end of the torsion spring (13) at its inside diameter and fixing means for fixing the spring end to the spring holding cone (1) in a torque resistant way. The fixing means comprise a flank (5) which protrudes from the outside surface (2) and engages between the first spring turn (12) and the second spring turn of the torsion spring (13) at the spring end. The flank (5) extends over less than 180° of the circumference of the outside surface (2); and a securing element (6) extends over a flank-free area of the outside surface (2). The securing element (6) has a recess for holding a torque transfer leg (14) projecting in a radial direction from the torsion spring (13); and the recess is limited in at least one tangential direction around the circumference of the outside surface (2) by a stopping face for the torque transfer leg (14).

11 Claims, 2 Drawing Sheets

SPRING HOLDING CONE FOR HOLDING A SPRING END OF A SPIRAL TORSION SPRING

CROSS REFERENCE TO RELATED APPLICATIONS

This application claims priority to co-pending European Patent Application No. 02 001 723.3 entitled "Federaufnahmekonus für ein Federende einer spiralformigen Torsionsfeder", filed Jan. 25, 2002.

FIELD OF THE INVENTION

The invention generally relates to a spring holding cone for holding a spring end of a spiral torsion spring. Particularly, the invention relates to a spring holding cone for holding a spring end of a sectional door spring for an industrial door or a garage sectional door. Such a spring holding cone has an outside surface for supporting the torsion spring at its inside diameter and fixing means for fixing the spring end to the spring holding cone in a torque resistant way, the fixing means comprising a flank which protrudes from the outside surface and engages between the spring turns of the torsion spring at the spring end.

BACKGROUND OF THE INVENTION

In sectional doors torsion springs serve for compensating for the different effective weight forces of the sectional doors. To this end, the torsion springs torsion-elastically support shafts of rope drums, on which holding ropes for the sectional doors are wound.

To achieve a torsion-elastic support by means of a spiral torsion spring, the ends of the torsion spring are to be fastened on the one side to a fixed part of the door construction, for example, and on the other side to the shaft to be supported, each time in a manner which is resistant to torsion loads. A so-called fixed cone is used on the one side, and a so-called clamping cone is used on the other side. The generic term used here for both of these two cones is spring holding cone. The name "cone" is attributable to the fact that the outside surface which supports the torsion spring at its internal diameter conically increases in diameter in the axial direction away from the torsion spring in most of these devices. The conical shape of the outside surface is to be adapted to the inside diameter of the spiral torsion spring that contracts under torsion load. Instead of a conical outside surface steadily increasing in size, an outside surface which increases in size step by step can be provided.

A known spring holding cone has two securing elements, which are two clamps to be fastened to a main body by means of screws for holding the first spring turn of the torsion spring at the spring end. The two clamps have to be adapted to the relevant spring wire thickness and the relevant spring diameter, and they are arranged opposite to each another at an offset of 180° of the circumference of the outside surface. Further, the known spring holding cone has coaxial fastening holes, in order to use it on one hand as fixed cone and on the other hand in connection with a clamping part as a clamping cone. A disadvantage of this known spring holding cone is that it does not hold the spring end positively but only non-positively, i.e. by means of friction between the cone and the spring wire, and that the expenditures for installing the spring end on the spring holding cone are quite high. The same clamping part may, however, be used with spring holding cones of different sizes for different inside diameters of the torsion spring because of the same spacing of the fastening holes in these cones.

A further known spring holding cone has a projecting from its outside surface and forming an external thread on the outside surface which is to be screwed-in between the spring turns of the torsion spring. Afterwards, the spring end is to be heated up and then the end of the spring wire is to be bent over into a recess within the outside surface for fixing the spring end to the spring holding cone in a positive and torque resistant way. As a result, the expenses for attaching the spring holding cone to a torsion spring are very high. Moreover, this known spring holding cone is provided in two different embodiments as a clamping cone with integrated clamping part, on the one hand, and as a fixed cone, on the other hand. In smaller production series this reduces the utilization of tools for forming the spring holding cones. It must also be considered that due to the,external thread formed by the flank on the outside surface of the known spring holding cone the spring holding cone is suitable only for torsion springs in a certain direction of thread, and additional embodiments of the spring holding cones are required for the opposite direction of thread.

It is an object of the invention to provide a spring holding cone which can be both manufactured and assembled economically.

It is a further object of the invention to provide a spring holding enabling an easy positive fixation of the spring end to the spring holding cone.

SUMMARY OF THE INVENTION

The invention provides a cone for holding a spring end of a spiral torsion spring having a plurality of spring turns and a torque transfer leg projecting in a radial direction from the torsion spring; the spring holding cone comprising an outside surface for supporting the spring end of the torsion spring at its inside diameter, the outside surface having a circumference, and fixing means for fixing the spring end to the spring holding cone in a torque resistant way; the fixing means comprising a flank, the flank protruding from the outside surface, extending over less than 180° of the circumference of the outside surface, thus leaving a flank-free area of the outside surface, and being arranged and intended for engaging between spring turns of the spring end of the torsion spring, a securing element extending above the flank-free area of the outside surface, the securing element having at least one recess for holding the torque transfer leg of the spring end, the recess being limited in at least one circumferential direction around the outside surface by a stopping face for the torque transfer leg.

The new spring holding cone comprises the flank on the outside surface only over a limited part of its circumference. Thus, the first spring turn of the unloaded torsion spring may be easily pressed over the flank, or it is at least easily possible to screw the flank between the first and the second spring turn. A spring end may be fixed to the new spring holding cone in a torque resistant way by means of a torque transfer leg projecting from the torsion spring in a radial direction. Such a torque transfer leg can be provided with relatively little expense in the manufacture of the torsion spring by bending over the last part of the spring wire. In no case it is necessary to form the torque transfer leg on the spring holding cone after the spring end has been attached to the cone. Rather, the torque transfer leg is just brought into the recess of the fixing means, where it abuts against the stopping face in transferring torque. Thus, the torque is transferred in the new spring holding cone between the torque transfer leg and the stopping face in a positive way, i.e. not or not only by means of friction.

It is preferred if a one-part main body of the spring holding cone both comprises the outside surface and the stopping face of the new spring holding cone, so that no connections may get loose between the outside surface and the stopping face. However, in principle, a multi-part formation of the new spring holding cone as parts connected together permanently or detachably is also possible.

Normally, a torsion spring for a sectional door always stands under a certain stress, so that the torque transfer leg is always pressed against the stopping face. Thus it is automatically prevented that the torque transfer leg emerges out from the recess in the securing element. Nevertheless, an additional locking element can be attached to the securing element so that it closes the recess in that circumferential direction opposite to the stopping face. The torque transfer leg is thus definitively held within the recess.

The locking element can be a locking pin, for example a spring pin, which engages in a locating bore in the securing element. This construction is stable enough and nevertheless cost-favourable both in manufacture and in attaching the new spring holding cone to a spring end of a torsion spring. Other possible locking means are, for example, clamps or clips.

The securing element may have two opposing recesses with stopping faces pointing away from each other. This arrangement enables the application of the new spring holding cone independently of the thread direction of the torsion spring. The recess for holding the torque transfer leg of a particular spring is selected by the stopping face against which the torque transfer leg is pressed by the torsion load on the torsion spring.

With regard to the flank it is preferred that it extends over less than 100° of the circumference of the outside surface, and that it engages between the first and the second spring turn of the torsion spring at the relevant spring end. Further, it is suitable that the extension of the flank for smaller inside diameters of the torsion spring is not only smaller in total but also with regard to the circumference of the outer surface as compared to larger inside diameters of the torsion spring.

Further, it is preferred that the securing element diametrically opposes the flank with regard to the outside surface, i.e. that the securing element and the flank are arranged at an offset of 180° about the outside surface. Thus the first spring turn at the spring end is held on the spring holding cone in two areas located opposite to each other, on the one hand by the securing element and on the other by the flank.

Further, it is preferred that the outside surface conically increases in size, and that it is roughened. The conical outside surface, against which the torsion spring abuts under torsion load due to, its reduction in its inside diameter is preferably roughened to the end that the spring turns do not slip off from the outside surface in applying torsion load to the torsion spring, and that a uniform running behaviour of the spring turns in the transitional area at the end of the spring holding cone within the torsion spring is guaranteed. Alternatively, the outside surface can comprise a diameter which is increasing not steadily but step by step.

At least one pair of coaxial fastening holes can be provided in the new spring holding cone. Thus, the spring holding cone as such can be used as a fixed cone. Further, it can be connected with a clamping part, in order also to be used as a clamping cone. Here the clamping part can be the same for spring holding cones for different inside diameters of the torsion spring.

In large production series it can also be expedient to form the clamping part as one part with the remainder of the spring holding cone in order to manufacture a clamping cone which has especially low assembly cost. In this case one part forms the outside surface and engaging surfaces for clamping tools.

Especially with regard to torsion springs having an inside diameters which is much larger than the shafts which is supported by and running through them, a further advantage can be achieved in that an inside surface is provided at the new spring cone in order to support one end of a supporting tube which in its main area between a pair of spring holding cones supports the torsion spring at its inside diameter. Supporting the torsion spring at its inside diameter prevents its buckling under torsion load. The position of the supporting tube with regard to the shaft running through the torsion spring is completely defined by two spring holding cones at its ends, i.e. a fixed cone and a clamping cone. The length of the supporting tube abutting against both spring holding cones can be used to determine the assembly distance between the spring holding cones along the shaft supported by the torsion spring.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
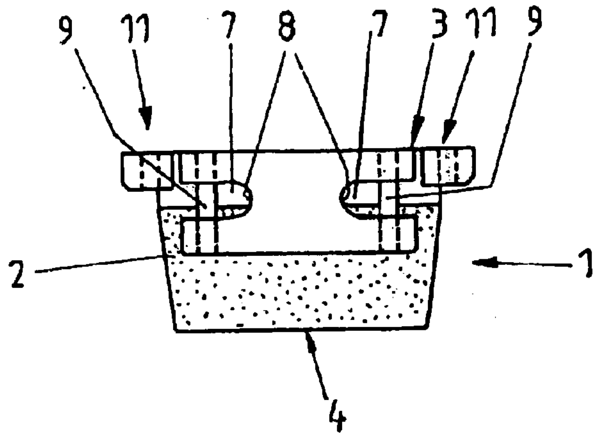
FIG. 1 is a radial view of a first embodiment of the new spring holding cone showing its securing means.
Figure 2:
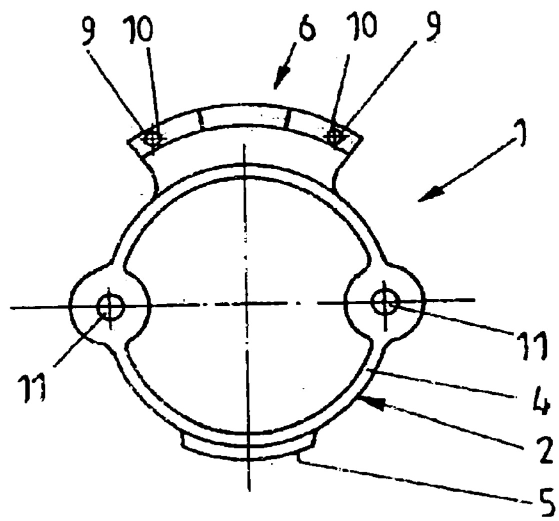
FIG. 2 is an axial view of the spring holding cone of FIG. 1.
Figure 3:
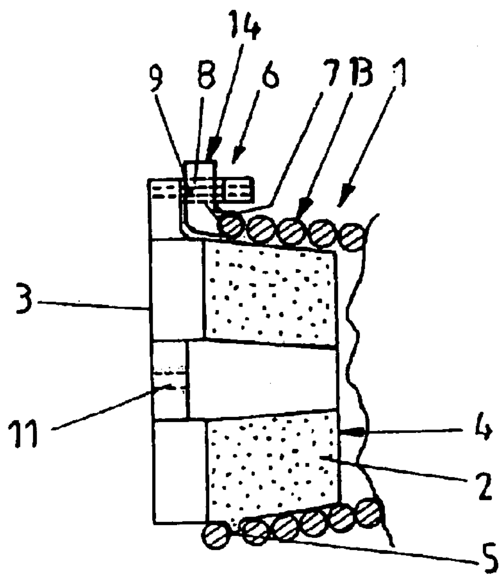
FIG. 3 is a further radial view of the spring holding cone of FIGS. 1 and 2, the perspective being offset by 90° in relation to FIG. 1.

The spring holding cone shown in FIGS. 1 to 3 has an outside surface 2 conically increasing in diameter. The circumference of the outside surface 2 increases towards a free end 3 of the spring holding cone 1, which is located opposite to an end 4, which is to be inserted in a spring end of a torsion spring. The torsion spring is pushed onto the outside surface 2 until a flank 5, which projects from the outside surface 2, engages between the first and the second spring turn. This can be effected in that the first spring turn is pressed over the flank 5, or that the flank 5 is screwed in between the first and the second spring turn. A securing element 6, which "overhangs", i.e. extends above, the outside surface 2 in a flank-free area, is provided diametrically opposite to the flank 5. Two recesses 7 are provided in the securing element 6 which may accept a torque transfer leg to which the end of the spring wire of the torsion spring is bent in a radial outward direction. The criteria for selecting one of the two recesses 7 for actually accepting the torque transfer leg is that the torsion load of the torsion spring presses the torque transfer leg (not shown here) against a stopping face 8 of that particular recess 7. To also prevent a dynamic escape of the torque transfer leg out of the selected recess 7, a spring pin 9 can be fitted in a bore 10 so that it closes the recess 7 in the circumferential direction opposite to the stopping face 8. The outside surface 2 is roughened to prevent the spring turn of the spring end from slipping off. Fastening holes 11 are provided to use the spring holding cone either as fixed cone, or to connect it to a load bearing element or clamping part. The entire spring holding cone 1 according to FIGS. 1 to 3 consists of a single unit, which can be integrally manufactured by injection moulding.

Figure 4:
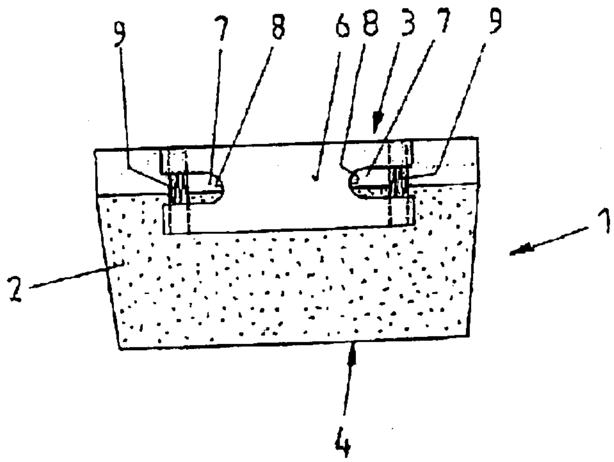
FIG. 4 is a radial view corresponding to FIG. 1 of a second embodiment of the spring holding cone.
Figure 5:
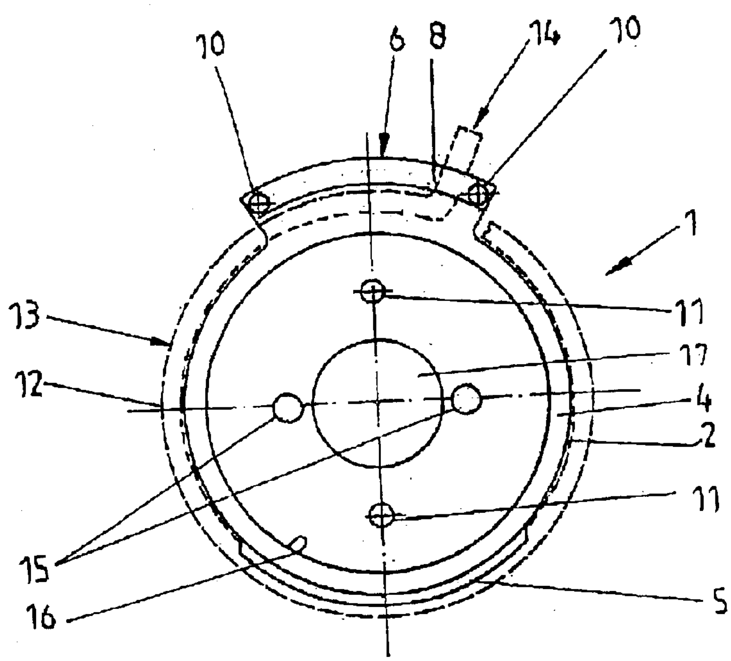
FIG. 5 is an axial view corresponding to FIG. 2 of the spring holding cone of FIG. 4, a spring end being indicated by dashed lines.

The same applies to the spring holding cone 1 according to FIGS. 4 and 5, which differs from the spring holding cone 1 according to FIGS. 1 to 3 in that it is provided for a torsion spring with a larger inside diameter. This torsion spring 13 is indicated in the form of a spring turn by a dashed line in FIG. 5. It is the first spring turn 12 at the spring end of the torsion spring 13. The torque transfer leg 14, which is bent over in a radial direction, can be seen here. The fastening holes 11 are also provided in the spring holding cone according to FIGS. 4 and 5 in the same spacing as in the spring holding cone according to FIGS. 1 and 3. Next to them there are further fastening holes 15 at a different spacing. However, the same clamping parts can be attached using the fastening holes 11 as in the embodiment according to FIGS. 1 to 3. A further difference in the detail consists in that the flank 5 according to FIGS. 4 and 5 extends over about 90° of the circumference of the outside surface 2, whereas the extent of the flank 5 according to FIG. 1 to 3 corresponds to only about 50°. This corresponds to a higher form stiffness and a resulting smaller axial withdrawal forces of the spring holding cone for torsion springs with a same wire thickness but with a smaller inside diameter. In torsion springs with larger inside diameter it is also expedient to support the relevant torsion spring at its inside diameter in the area between the spring holding cones 1 fitted at the end of it. For this purpose a supporting tube not shown here, which is supported with its outside diameter by an inside surface 16 of the spring holding cone 1 according to FIG. 5 and the length of which can determine the assembly spacing for a fixed cone and a clamping cone for the respective torsion spring, can be used. The supporting tube prevents that the torsion spring 13 buckles around a shaft which runs through a central opening 17 in the spring holding cones 1 and the outside diameter of which is much smaller than the inside diameter of torsion springs having a large inside diameter.

Figure 6:
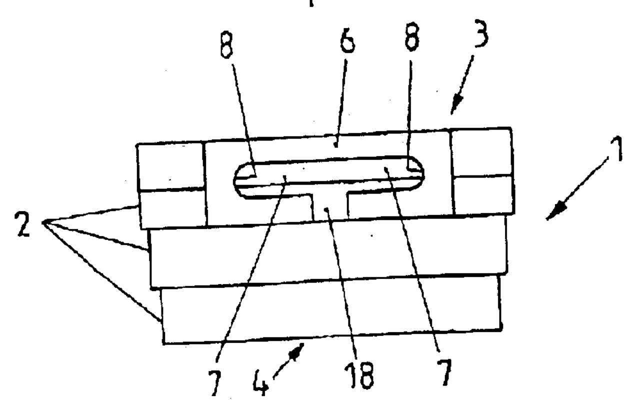
FIG. 6 is a radial view corresponding to FIG. 1 of a third embodiment of the spring holding cone.

The embodiment of the spring holding cone 1 according to FIG. 6 differs in two essential points from the embodiments shown in the previous FIGS. 1 to 5. On the one hand the outside surface 2 is not formed so that it constantly increases in diameter. I.e., the outside surface 2 is not conical here but step-shaped. In this case roughening of the outside surface 2 is not that necessary, since in supporting a torsion spring contracting with regard to its inside diameter under torsion load the step-shaped outside surface 2 results in at lower axial withdrawal forces from the spring holding cone 1. A further difference of the embodiment of the spring holding cone 1 according to FIG. 6 from the previously described embodiments can be seen in that here the recesses 7 and the stopping faces 8 for torsion springs of different thread direction are opposing each another instead of facing away from one another. To get into these recesses 7, the torque transfer leg of the respective torsion spring is guided through a passage 18. A means for locking for the torque transfer leg within the relevant recess 7 can indeed also be provided in the embodiment of the spring holding cone 1 according to FIG. 6, but it is less necessary than with the embodiment according to the preceding FIGS. 1 to 5.

Independently of its size, for example designed for customary inside diameters of torsion springs for sectional doors of 50, 65, 95, 142 or 152 mm, the new spring holding cone is simple in its manufacture and its assembly and at the same time provides for a fixation of the spring end which is absolutely torque resistant.

LIST OF REFERENCE SIGNS

1-Spring holding cone
2-Outside surface
3-End
4-End
5-Flank
6-Securing element
7-Recess
8-Stopping face
9-Spring pin
10-Bore
11-Fastening hole
12-Spring turn
13-Torsion spring
14-Torque transfer leg
15-Fastening hole
16-Inside surface
17-Opening
18-Passage

We claim:

1. A spring holding cone for holding a spring end of a spiral torsion spring having a plurality of spring turns and a torque transfer leg projecting in a radial direction from the torsion spring, the spring holding cone comprising:
- an outside surface for supporting the spring end of the torsion spring at its inside diameter, the outside surface having a circumference, and
- fixing means for fixing the spring end to the spring holding cone in a torque resistant way,
- the fixing means comprising
  - a flank, the flank
    - protruding from the outside surface,
    - extending over less than 180° of the circumference of the outside surface, thus leaving a flank-free area of the outside surface, and
    - being arranged and intended for engaging between spring turns of the spring end of the torsion spring,
    - a securing element extending above the flank-free area of the outside surface,
    - the securing element having at least one recess for holding the torque transfer leg of the spring end,
    - the recess being limited in at least one circumferential direction around the outside surface by a stopping face for the torque transfer leg, and
  - a locking element which is detachably attached to the securing element so that it closes the recess in the circumferential direction opposite to the stopping face.

2. The spring holding cone of claim 1, wherein the outside surface and the stopping face are formed by one same part of the spring holding cone.

3. The spring holding cone of claim 1, wherein the locking element is a locking pin which is fitted into a bore within the securing element.

4. The spring holding cone of claim 1, wherein the flank extends over less than 100° of the circumference of the outside surface and is arranged and intended to engage between the first and the second spring turn of the spring end of the torsion spring.

5. A spring holding cone for holding a spring end of a spiral torsion spring having a plurality of spring turns and a torque transfer leg projecting in a radial direction from the torsion spring, the spring holding cone comprising:

an outside surface for supporting the spring end of the torsion spring at its inside diameter, the outside surface having a circumference, and fixing means for fixing the spring end to the spring holding cone in a torque resistant way, the fixing means comprising a flank, the flank protruding from the outside surface, extending over less than 180° of the circumference of the outside surface, thus leaving a flank-free area of the outside surface, and being arranged for engaging between spring turns of the spring end of the torsion spring, a securing element extending above the flank-free area of the outside surface, the securing element having two recesses for holding the torque transfer leg of the spring end, the recesses pointing away from one another and each limited in one circumferential direction around the outside surface by a stopping face for the torque transfer leg.

6. A spring holding cone for holding a spring end of a spiral torsion spring having a plurality of spring turns and a torque transfer leg projecting in a radial direction from the torsion spring, the spring holding cone comprising:

an outside surface for supporting the spring end of the torsion spring at its inside diameter, the outside surface having a circumference, and fixing means for fixing the suring end to the spring holding cone in a torque resistant way.

the fixing means comprising a flank, the flank protruding from the outside surface, extending over less than 180° of the circumference of the outside surface, thus leaving a flank-free area of the outside surface, and being arranged and intended for engaging between spring turns of the spring end of the torsion spring, a securing element extending above the flank-free area of the outside surface, the securing element being located diametrically opposite to the flank with regard to the circumference of the outside surface and defining a recess for holding the torque transfer leg of the spring end, and the recess being limited in at least one circumferential direction around the outside surface by a stopping face for the torque transfer leg.

7. The spring holding cone of claims 1, 5 or 6, wherein the outside surface has a frusto-conical shape.

8. The spring holding cone of claims 1, 5 or 6, wherein the outside surface is roughened.

9. The spring holding cone of claims 1, 5 or 6, further comprising at least one pair of coaxial fastening holes extending through an end wall of the spring holding cone.

10. The spring holding cone of claims 1, 5 or 6, further comprising an inside surface provided to be supported on a supporting tube for supporting the torsion spring at its inside diameter.

11. A spring arrangement comprising a sectional door spring having a spring end, the spring end comprising a plurality of spring turns and a torque transfer leg projecting in a radial direction from the torsion spring, and a spring holding cone, the spring holding cone comprising:

an outside surface supporting the spring end of the torsion spring at its inside diameter, the outside surface having a circumference, and fixing means fixing the spring end to the spring holding cone in a torque resistant way, the fixing means comprising a flank, the flank protruding from the outside surface, extending over less than 180° of the circumference of the outside surface, thus leaving a flank-free area of the outside surface, and engaging between spring turns of the spring end of the torsion spring, a securing element extending above the flank-free area of the outside surface, the securing element having two recesses for holding the torque transfer leg of the spring end, the recesses pointing in opposed directions, the recesses being limited in at least one circumferential direction around the outside surface by a stopping face for the torque transfer leg.

* * * * *